United States Patent
Chien et al.

(10) Patent No.: US 10,511,416 B2
(45) Date of Patent: Dec. 17, 2019

(54) USER EQUIPMENT AND BASE STATION

(71) Applicant: Institute For Information Industry, Taipei (TW)

(72) Inventors: Chun-Che Chien, Taipei (TW); Hai-Han Wang, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 15/928,046

(22) Filed: Mar. 21, 2018

(65) Prior Publication Data

US 2018/0278371 A1    Sep. 27, 2018

Related U.S. Application Data

(60) Provisional application No. 62/475,840, filed on Mar. 23, 2017.

(51) Int. Cl.
| | |
|---|---|
| *H04L 1/18* | (2006.01) |
| *H04W 52/32* | (2009.01) |
| *H04W 72/04* | (2009.01) |
| *H04L 1/00* | (2006.01) |
| *H04L 5/00* | (2006.01) |

(52) U.S. Cl.
CPC ............ *H04L 1/189* (2013.01); *H04L 1/0025* (2013.01); *H04W 52/322* (2013.01); *H04W 72/0413* (2013.01); *H04L 5/0048* (2013.01)

(58) Field of Classification Search
CPC ....... H04L 1/189; H04L 1/887; H04L 1/1864; H04L 1/1896; H04L 1/0009; H04L 1/0025; H04L 1/0003; H04L 5/0048; H04L 5/0053; H04W 52/322; H04W 72/04; H04W 72/0413; H04W 92/18; H04W 28/04
See application file for complete search history.

(56) References Cited

U.S. PATENT DOCUMENTS

2016/0262118 A1*  9/2016  Kim .................... H04W 52/365
2016/0353424 A1   12/2016 Stirling-Gallacher et al.
2017/0347394 A1* 11/2017 Yasukawa ............. H04W 28/04
(Continued)

FOREIGN PATENT DOCUMENTS

| | | |
|---|---|---|
| CN | 104321994 A | 1/2015 |
| CN | 106304349 A | 1/2017 |
| EP | 2945441 A1 * | 11/2015 |

(Continued)

OTHER PUBLICATIONS

Office Action to the corresponding Taiwan Patent Application No. 107109458 rendered by the Taiwan Intellectual Property Office (TIPO) dated Jun. 5, 2019, 7 pages.
(Continued)

*Primary Examiner* — Afsar M Qureshi
(74) *Attorney, Agent, or Firm* — Skaar Ulbrich Macari, P.A.

(57) ABSTRACT

A user equipment (UE) and a base station (BS) are provided. The UE transmits a first uplink signal to the BS based on a current data repetition transmission parameter. After receiving a dynamic indication message from the BS, the UE generates an updated data repetition transmission parameter according to the dynamic indication message. The UE transmits a second uplink signal to the BS based on the updated data repetition transmission parameter.

24 Claims, 18 Drawing Sheets

(56) References Cited

U.S. PATENT DOCUMENTS

2018/0263036 A1* 9/2018 Hsieh ................ H04L 5/00
2018/0352424 A1* 12/2018 Byun ................ H04W 4/00

FOREIGN PATENT DOCUMENTS

TW          201129139 A      8/2011
TW          201628444 A      8/2016
WO       2018130183 A1 *    7/2018

OTHER PUBLICATIONS

Nokia Corporation and Nokia Networks, "Discovery signal repetition", 3GPP TSG-RAN WG1 Meeting #78bis, R1-144169, Ljubljana, Slovenia, Oct. 6-10, 2014. "https://www.3gpp.org/DynaReport/TDocExMtg--R1-78b-30662.htm", 7 pages.

Office Action to the corresponding Taiwan Patent Application No. 107109458 rendered by the Taiwan Intellectual Property Office (TIPO) on Sep. 9, 2019, 9 pages.

Changsheng Yu, Li Yu, Yuan Wu, Yanfei He, and Qun Lu; "Uplink Scheduling and Link Adaptation for Narrowband Internet of Things Systems"; IEEE Access; Mar. 13, 2017; pp. 1724-1734, 11 pages.

* cited by examiner

USER EQUIPMENT AND BASE STATION

PRIORITY

This application claims priority to U.S. Provisional Application No. 62/475,840 filed on Mar. 23, 2017, which is hereby incorporated by reference in its entirety herein.

FIELD

The present invention relates to a user equipment and a base station. Specifically, the user equipment may update a data repetition transmission parameter according to a dynamic indication message transmitted by the base station.

BACKGROUND

With the rapid development of the wireless communication technology, various applications of wireless communication are ubiquitous in people's life, and demands of the people for wireless communication are also increasing day by day. The 4G mobile communication system (or called the Long Term Evolution (LTE) system) currently available is the main mobile communication system used by most countries.

For some communication applications, e.g., for the application that supports ultra-reliable low latency communication (URLLC) service in the next generation mobile communication system (which is generally called the 5G mobile communication system currently), the user equipment repeatedly transmits the same uplink data (i.e., corresponding to the same transport block from the upper layer) to the base station by using different physical resource blocks, thereby ensuring that the uplink data can be received by the base station. However, in specifications of the current communication system, how the user equipment repeatedly transmits the relevant parameter configuration (e.g., a resource block size, a repetition pattern, a modulation and coding scheme (MCS) and a transmission power or the like) of the uplink data is configured by the base station itself and cannot be dynamically updated according to various conditions of the user equipment. Therefore, the conventional uplink data repetition transmission configuration scheme has drawbacks of a low resource utilization efficiency, fixed spectrum resources, fixed reception delay, being vulnerable to influence of the channel, limited application situation and a low autonomy of the user equipment or the like.

Accordingly, an urgent need exists in the art to provide an uplink data repetition transmission configuration scheme so as to improve the resource utilization efficiency, the using flexibility of the spectrum resources and the flexibility of the reception delay, reduce the influence of the channel, and increase the applications and the autonomy of the user equipment.

SUMMARY

The disclosure includes an uplink data repetition transmission configuration scheme, through which a user equipment may update data repetition transmission parameters according to a dynamic indication message transmitted by the base station. Accordingly, the uplink data repetition transmission configuration scheme may improve the resource utilization efficiency, the using flexibility of the spectrum resources and the flexibility of the reception delay, reduce the influence of the channel, and increase the applications and the autonomy of the user equipment.

The disclosure includes a user equipment which comprises a storage, a transceiver and a processor. The processor is electrically connected to the storage and the transceiver and is configured to execute the following operations: transmitting a first uplink signal to a base station based on a current data repetition transmission parameter; receiving a dynamic indication message from the base station via the transceiver; generating an updated data repetition transmission parameter according to the dynamic indication message after receiving the dynamic indication message; and transmitting a second uplink signal to the base station via the transceiver based on the updated data repetition transmission parameter.

Moreover, the disclosure includes a base station which comprises a storage, a transceiver and a processor. The processor is electrically connected to the storage and the transceiver and is configured to perform the following operations: receiving a first uplink signal from a user equipment via the transceiver, the first uplink signal being transmitted by the user equipment based on a current data repetition transmission parameter; transmitting a dynamic indication message to the user equipment via the transceiver so that the user equipment generates an updated data repetition transmission parameter according to the dynamic indication message and transmits a second uplink signal based on the updated data repetition transmission parameter; and receiving the second uplink signal from the user equipment via the transceiver.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments
} thereof. However, these example embodiments are not intended to limit the present invention to any specific examples, embodiments, environment, applications or particular implementations described in these example embodiments. Therefore, description of these example embodiments is only for purpose of illustration rather than to limit the present invention.

It should be appreciated that, in the following embodiments and the attached drawings, elements unrelated to the present invention are omitted from depiction; and dimensional relationships among individual elements in the attached drawings are provided only for ease of understanding, but not to limit the actual scale.

Figure 1:
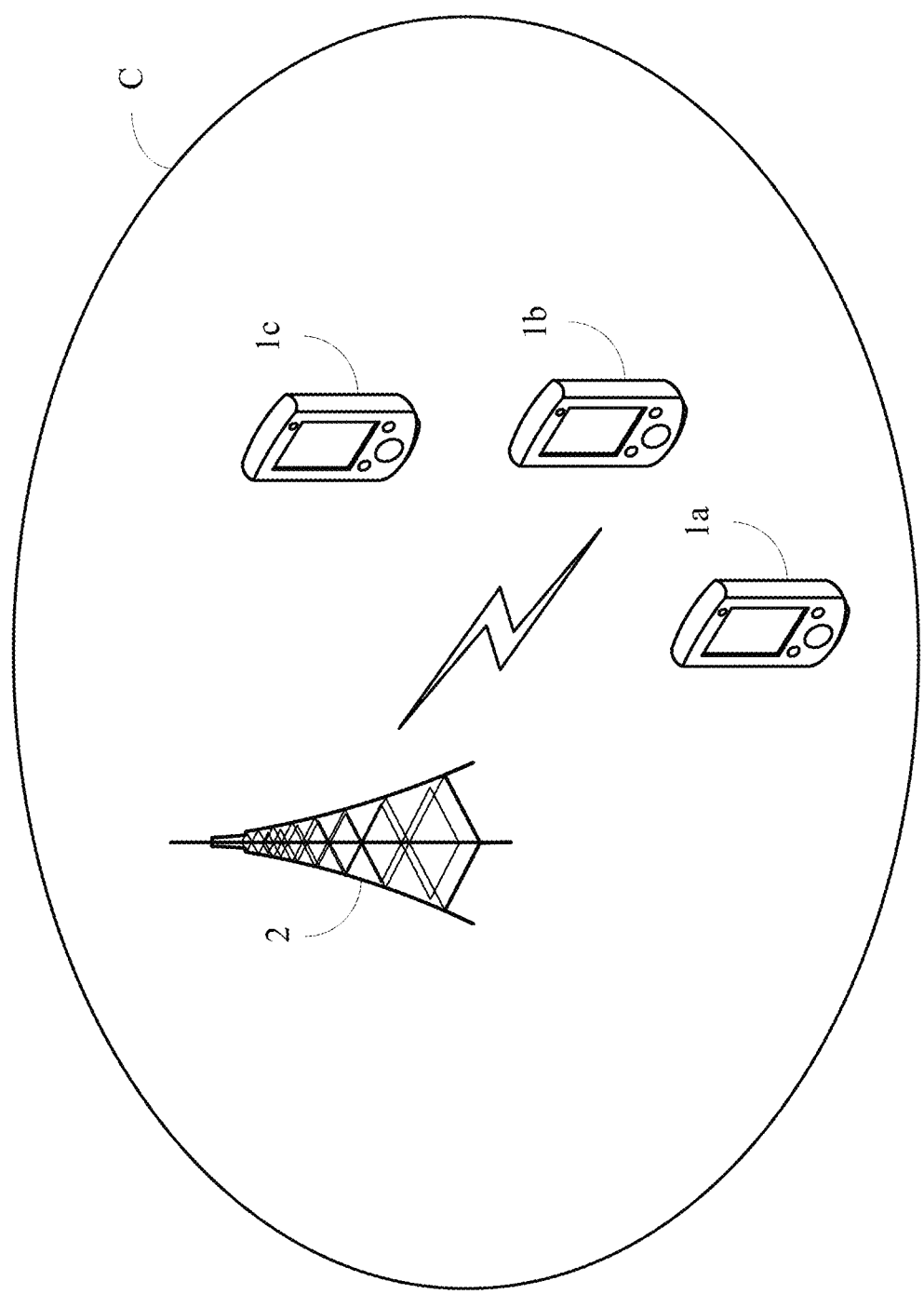
FIG. 1 depicts an implementation scenario of a communication system of the present invention.
Figure 2:
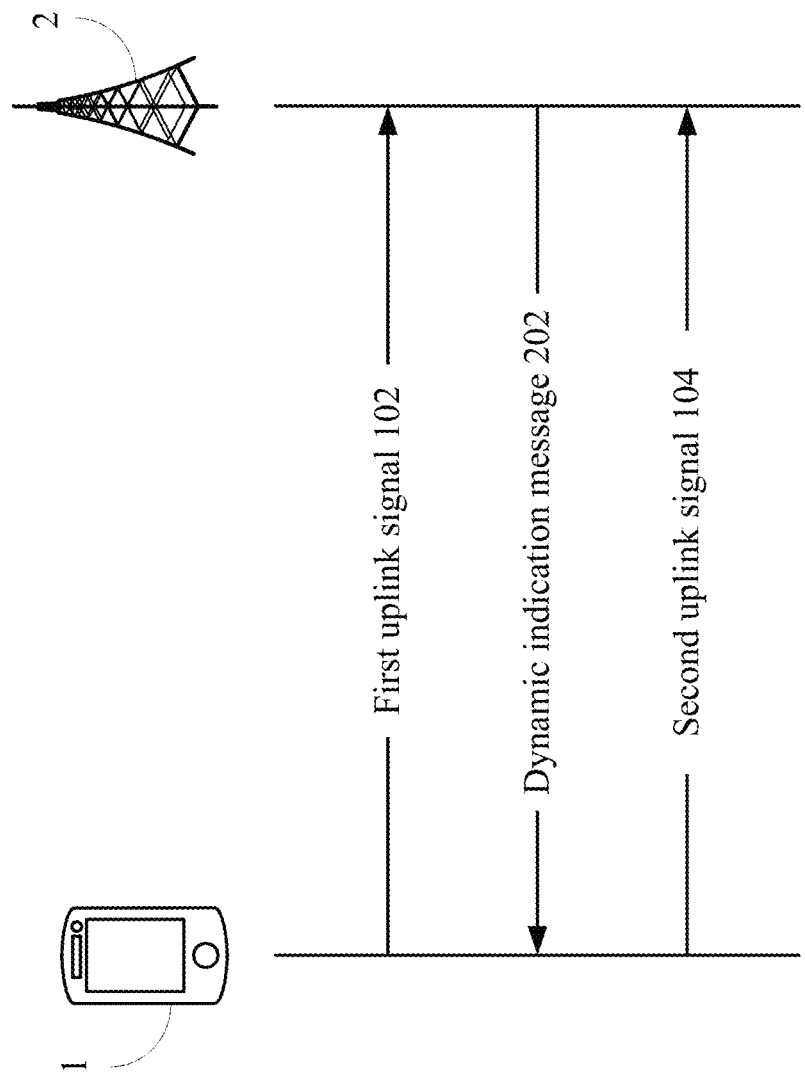
FIG. 2 depicts an implementation scenario of signal transmission between a user equipment 1 and a base station 2 of the present invention.

A first embodiment of the present invention is as shown in FIG. 1 to FIG. 3E. FIG. 1 depicts an implementation scenario of a wireless communication system of the present invention. FIG. 2 depicts an implementation scenario of signal transmission between a user equipment 1 and a base station 2 of the present invention. It shall be appreciated that, in FIG. 2, the user equipment 1 may be any of user equipments 1a, 1b and 1c. For simplification of the description, FIG. 2 only depicts the signal transmission between a single user equipment 1 and the base station 2 as an example for illustration, and the signal transmission between the base station 2 and other user equipments shall be appreciated by those of ordinary skill in the art based on the following description, and thus will not be further described herein.

As shown in FIG. 1, the base station 2 in the wireless communication system has a signal coverage C, and the user equipments 1a, 1b and 1c are all located within the signal coverage C. For simplification of the description, only three user equipments 1a, 1b and 1c are depicted in FIG. 1. However, the number of the user equipments within the signal coverage C of the base station 2 is not intended to limit the present invention. The wireless communication system may be a mobile communication system based on the Orthogonal Frequency Division Multiple Access (OFDMA) technology, e.g., the current 4G mobile communication system (LTE system) or the next generation mobile communication system (which is generally called the 5G mobile communication system currently). Each of the user equipments 1a, 1b and 1c may be a smart phone, a tablet computer or any mobile communication device conforming to specifications of the mobile communication system, e.g., a user equipment (which is called a URLLC user equipment hereinafter) supporting ultra-reliable low latency communication (URLLC) service, a user equipment (which is called an eMBB user equipment hereinafter) supporting enhanced mobile broadband (eMBB) service, and a user equipment (which is called an mMTC user equipment hereinafter) supporting a massive machine type communication (mMTC) service, but it is not limited thereto.

In the present invention, the user equipment 1 repeatedly transmits the same uplink data (i.e., corresponding to the same transport block from the upper layer) to the base station 2 by using different physical resource blocks, thereby ensuring that the uplink data can be received by the base station 2. In other words, the uplink data repetition transmission configuration scheme of the present invention is applicable to any mobile communication system, having the communication application of repeatedly transmitting the same uplink data by the user equipment.

As shown in FIG. 2, the user equipment 1 transmits a first uplink signal 102 to a base station 2 based on a current data repetition transmission parameter, and receives a dynamic indication message 202 from the base station 2. The dynamic indication message 202 may be downlink control information (DCI) carried on a physical downlink control channel (PDCCH) or any indication message dynamically generated in response to the uplink data transmitted by the user equipment and carried on any physical downlink channel. The downlink control information may be a common DCI or a UE-specific DCI. The user equipment 1 generates an updated data repetition transmission parameter according to the dynamic indication message 202 after receiving the dynamic indication message 202, and transmits a second uplink signal 104 to the base station 2 based on the updated data repetition transmission parameter.

For example, the dynamic indication message 202 may indicate a repetition transmission resource configuration, and the repetition transmission resource configuration comprises at least one of the following data repetition transmission parameters: a resource block size, a repetition pattern, a Modulation and Coding Scheme (MCS) and a transmission power. In other words, the user equipment 1 may adjust the resource block size, the repetition pattern, the MCS and the transmission power for transmitting the subsequent uplink signals in response to the repetition transmission resource configuration.

Moreover, the dynamic indication message 202 may be used in combination with a pre-configured message of Radio Resource Control (RRC) on a physical downlink shared channel (PDSCH). The base station 2 provides multiple sets of pre-configured available data repetition transmission parameters and corresponding time-domain/frequency-domain resource mapping information to the user equipment 1 via the pre-configured message so that the user equipment 1 can subsequently select the corresponding data repetition transmission parameter (i.e., the updated data repetition transmission parameter) in response to the dynamic indication message 202 and transmit the uplink signal on the time-frequency resource corresponding to the updated data repetition transmission parameter based on the time-domain/frequency-domain resource mapping information. The pre-configured message may be a broadcast RRC message or a UE-specific RRC message.

It shall be appreciated by those of ordinary skill in the art that there are connections between the aforesaid data repetition transmission parameters. For example, when the available resource block size becomes greater, the user equipment 1 may use the modulation and coding mode of a lower level for data transmission, e.g., switch from the modulation mode of 64-Quadrature Amplitude Modulation (QAM) to 16-QAM and reduce the coding rate to increase the probability that the base station 2 successfully decoding the uplink signal. Therefore, based on the following description, it shall be readily appreciated by those of ordinary skill in the art that when a transmission parameter of the repetition transmission resource configuration is changed, other relevant transmission parameters may also be changed accordingly, and this will not be further described herein.

Figure 3A:
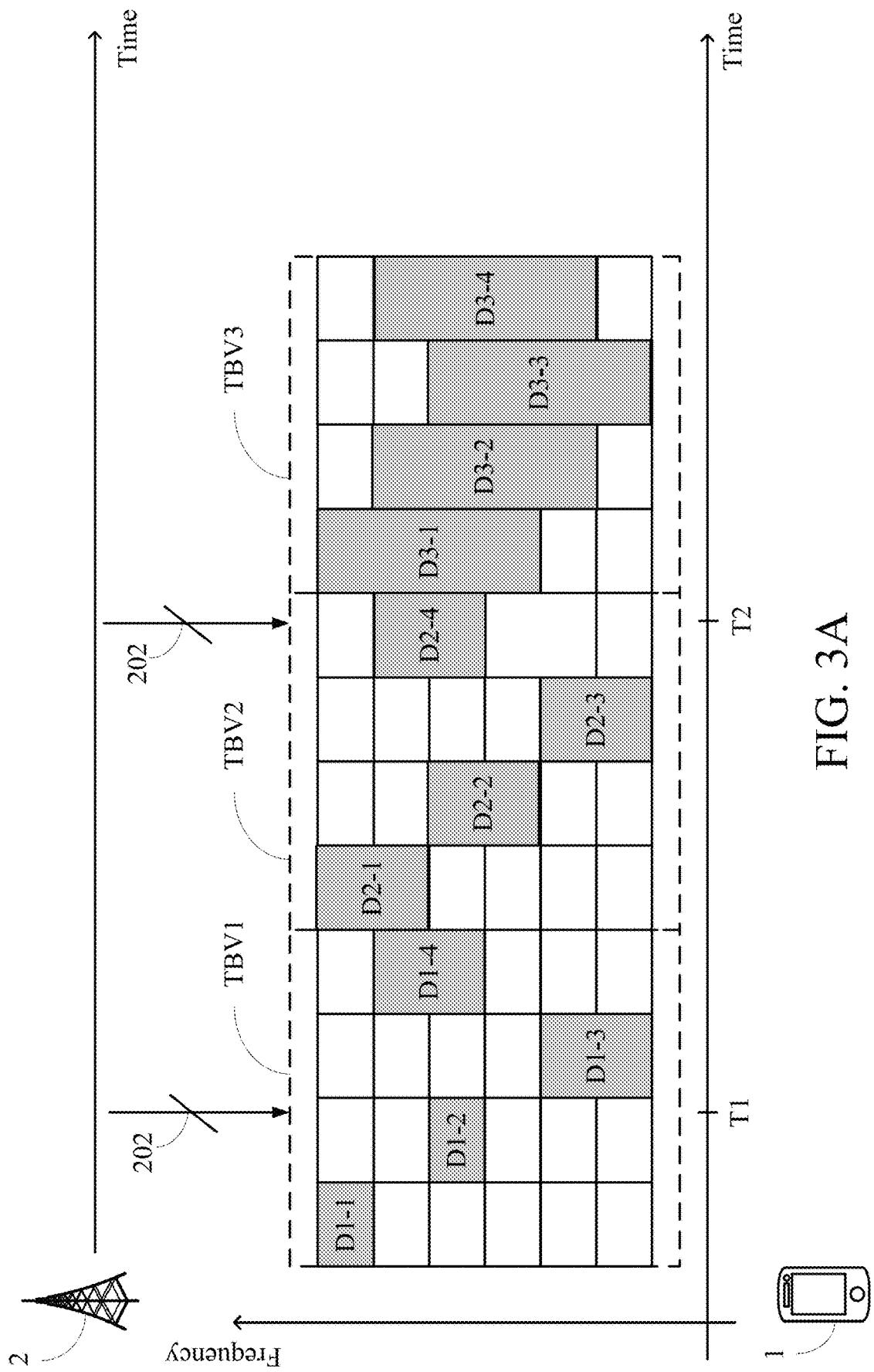
FIG. 3A to FIG. 3G respectively depict an implementation scenario of updating a data repetition transmission parameter by the user equipment 1.

Please refer to FIG. 3A, which depicts an implementation scenario of updating the resource block size by the user equipment 1. A first transport block interval TBV1 is an interval during which the user equipment 1 transmits uplink signals D1-1 to D1-4 based on a first transport block, a second transport block interval TBV2 is an interval during which the user equipment 1 transmits uplink signals D2-1 to D2-4 based on a second transport block, and a third transport block interval TBV3 is an interval during which the user equipment 1 transmits uplink signals D3-1 to D3-4 based on a third transport block. It shall be noted that, in the present invention, although the uplink signals of the same transport block interval use different resource block sizes, MCSs and/or transmission powers for transmission in response to a change in the data repetition transmission parameters, the uplink signals still carry the same uplink data (i.e., corresponding to a same transport block). In other words, the uplink signals D1-1 to D1-4 carry the same uplink data which corresponds to the first transport block, the uplink signals D2-1 to D2-4 carry the same uplink data which corresponds to the second transport block, and the uplink signals D3-1 to D3-4 carry the same uplink data which corresponds to the third transport block.

In FIG. 3A, after the user equipment 1 receives the dynamic indication message 202 at a first time point T1 (before the uplink signal D1-3 is transmitted), the user equipment 1 immediately updates the resource block size used currently for transmitting uplink signals so as to directly use the updated resource block size to transmit the subsequent uplink signals D1-3 to D1-4. Because no more dynamic indication messages are received by the user equipment 1 before the end of the first transport block interval TBV1, the user equipment 1 transmits the uplink signals D2-1 to D2-4 using the same data repetition transmission parameter in the second transport block interval TBV2, i.e., the resource block size for transmitting the uplink signals D2-1 to D2-4 remains to be the same as the resource block size for transmitting the uplink signals D1-3 to D1-4. Therefore, in this implementation scenario, the uplink signals D1-1 to D1-2 may be regarded as the first uplink signal 102 which is transmitted based on the data repetition transmission parameter before the updating (i.e., the current data repetition transmission parameter), and the uplink signals D1-3 to D1-4 and the uplink signals D2-1 to D2-4 may be regarded as the second uplink signal 104 which is transmitted based on the data repetition transmission parameter after the updating (i.e., the updated data repetition transmission parameter).

Thereafter, the user equipment 1 changes the resource block size again after receiving another dynamic indication message 202 at a second time point T2 (before the uplink signal D3-1 is transmitted), and uses the updated resource block size to transmit the uplink signals D3-1 to D3-4 in the next transport block interval (i.e., the third transport block interval TBV3). In this case, the uplink signals D1-3 to D1-4 and the uplink signals D2-1 to D2-4 may be regarded as the first uplink signal 102 which is transmitted based on the data repetition transmission parameter before the second time of updating (i.e., the current data repetition transmission parameter), and the uplink signals D3-1 and D3-4 may be regarded as the second uplink signal 104 which is transmitted based on the data repetition transmission parameter after the second time of updating (i.e., the updated current data repetition transmission parameter).

The first time point T1 and the second time point T2 described above are only used as examples for illustrating the time points at which the user equipment 1 receives the dynamic indication message 202, and are not intended to limit the time points at which the user equipment 1 receives the dynamic indication message 202 in the present invention. Moreover in the present invention, for the time point at which each of the dynamic indication messages is received, the uplink signal transmitted before receiving the dynamic indication message is called the first uplink signal 102 and the data repetition transmission parameter for transmitting the first uplink signal 102 is called the current data repetition transmission parameter, and the uplink signal transmitted after receiving the dynamic indication message is called the second uplink signal 104 and the data repetition transmission parameter for transmitting the second uplink signal 104 is called the updated data repetition transmission parameter.

It shall be appreciated that, in FIG. 3A, as the resource block size is increased, the number of times of repetition transmission or the length of the transport block interval is not changed. However, as shall be appreciated by those of ordinary skill in the art, for each of the transport block intervals, after the uplink signal is received by the base station 2, the base station 2 may transmit DCI via the PDCCH to indicate that the uplink signal has been successfully decoded or the uplink signal needs to be re-transmitted, or transmit a decoding correctness indicator via a Physical Hybrid-ARQ indicator channel (PHICH) or other physical channels so that the user equipment 1 can early terminate the transmission of the uplink signal of the current transport block interval or continue to transmit the uplink signal of the current transport block interval until the configured number of times of repetition transmission is reached depending on whether the base station 2 has successfully decoded the uplink signal.

For example, when the base station 2 successfully decodes the uplink signal D2-1 and the user equipment 1 has received the downlink indication message informing of the successful decoding of the uplink signal D2-1 from the base station 2 before the uplink signal D2-3 is transmitted, the user equipment 1 may terminate the transmission of the uplink signal D2-3 and the uplink signal D2-4 and then directly transmit the uplink signal D3-1. Therefore, under the scheme of early termination of the transport block, the user equipment 1 may stop transmitting the subsequent uplink signal corresponding to the current transport block immediately after the user equipment 1 receives the downlink indication message informing of the successful decoding of the uplink signal from the base station 2. Moreover, in FIG. 3A, the resource block that is not used by the user equipment 1 for transmitting uplink signal may be used by other user equipments for transmitting uplink signal, and the signal transmission between other user equipments and the base station 2 is like the signal transmission between the user equipment 1 and the base station 2 and thus will not be further described herein.

Figure 3B:
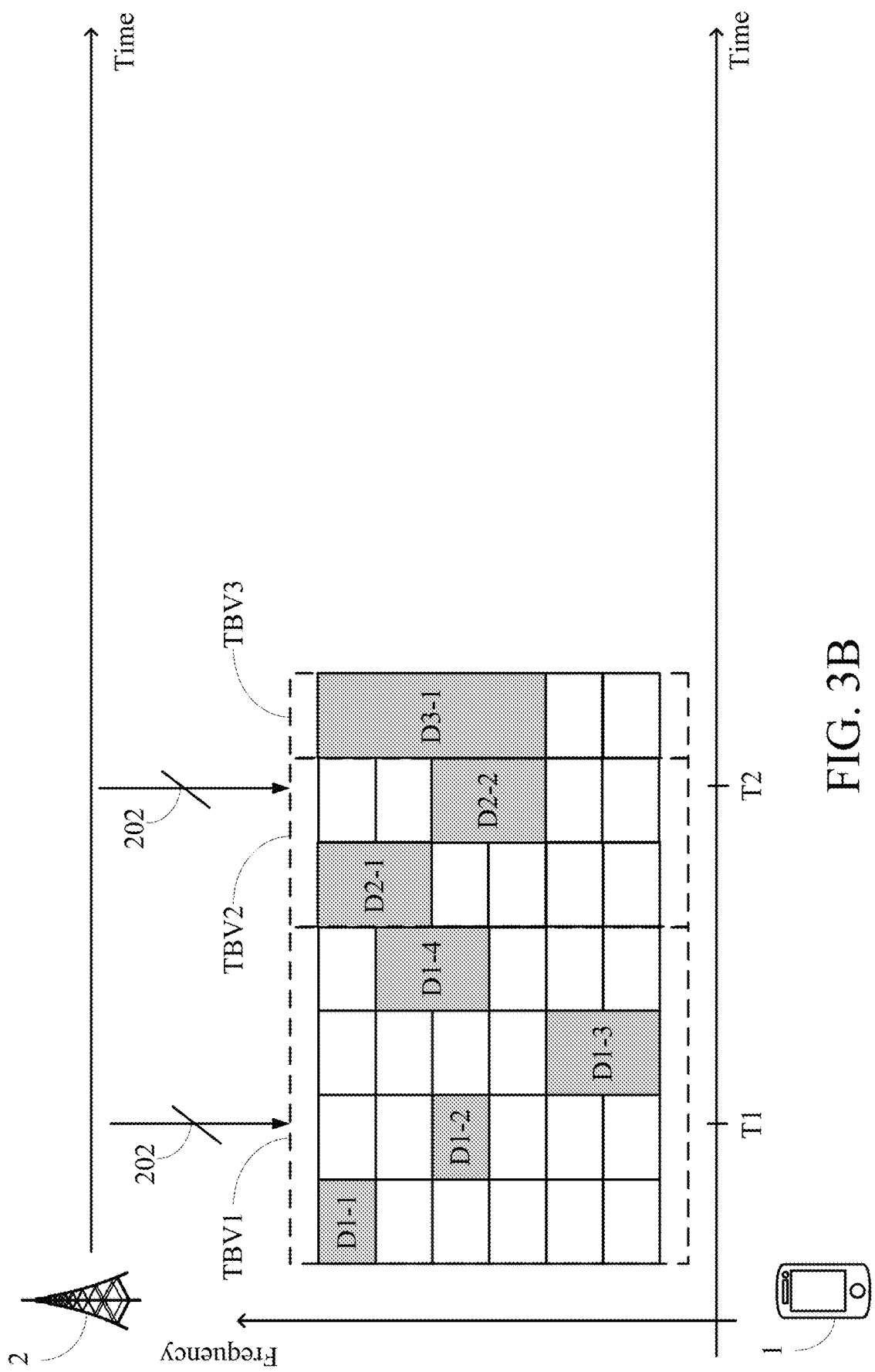

Please refer to FIG. 3B for another implementation scenario. Different from the implementation scenario of FIG. 3A, the implementation scenario of FIG. 3B further updates the repetition pattern while considering the change in the resource block size. In this implementation scenario, the repetition pattern is a time-domain repetition pattern, which defines the number of times of repetition transmission or the length of the transport block interval. As shown in FIG. 3B, after receiving the dynamic indication message 202 at the first time point T1, the user equipment 1 further updates the time-domain repetition pattern for transmitting the uplink signal corresponding to the next transport block in addition to updating the resource block size used currently for transmitting the uplink signal. That is, the second transport block interval TBV2 is shortened so as to reduce the number of times of repeatedly transmitting the uplink data. Therefore, in the second transport block interval TBV2, the user equipment 1 only transmits the uplink signals D2-1 and D2-2.

Similarly, after receiving another dynamic indication message 202 at the second time point T2, the user equipment 1 increases the resource block again for transmitting the uplink signal and reduces the third transport block interval TBV3 according to the repetition transmission resource configuration indicated by the dynamic indication message 202, so the user equipment 1 only transmits the uplink signal D3-1 in the updated third transport block interval TBV3. As described previously, when the available resource block size becomes greater, the user equipment 1 may use the modulation and coding mode of a lower level for data transmission to increase the probability of successfully decoding the uplink signal by the base station 2. Therefore, when the resource block size is increased, the number of times or interval of repetition transmission can be decreased to reduce the reception delay and balance the utilization efficiency of the spectrum resource in the present invention.

It shall be appreciated that, the number of times or interval of repetition transmission is decreased in the implementation scenario of FIG. 3B as an example for illustration. However, as shall also be appreciated by those of ordinary skill in the art, the number of times or interval of repetition transmission may also be increased in addition to increasing the resource block size in order to increase the probability of successfully decoding the uplink signal by the base station 2, and this will not be further described herein.

Figure 3C:
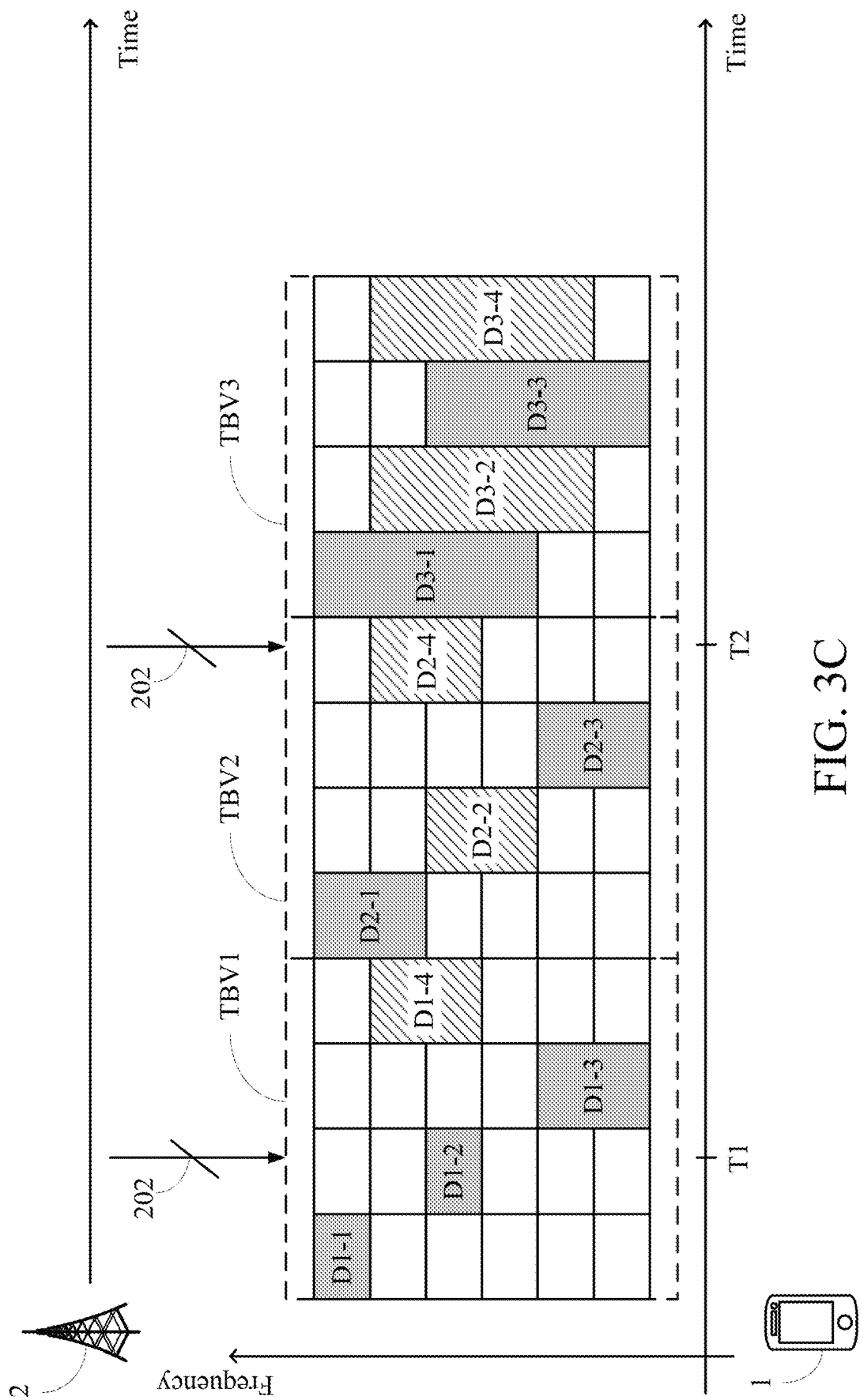

Please refer to FIG. 3C for another implementation scenario. The implementation scenario of FIG. 3C has the transport block interval of the same length as that of the implementation scenario of FIG. 3A, but it allows the user equipment 1 to further update the repetition pattern in addition to updating the resource block size used currently for transmitting the uplink signal after the user equipment 1 receives the dynamic indication message 202 at the first time point T1. In this implementation scenario, the repetition pattern is a repetition transmission mode, which allows the user equipment 1 to skip the transmission of part of uplink signals.

In detail, referring to FIG. 3C, the user equipment 1 updates the resource block size used for subsequently transmitting the uplink signals D1-3 and D1-4 and reduces the use of the resource block for transmission after receiving the dynamic indication message 202 at the first time point T1. As shown in FIG. 3C, in the first transport block interval TBV1, the resource block for transmitting the uplink signal D1-3 is larger than the resource block for transmitting the uplink signals D1-1 and D1-2. In this situation, the user equipment 1 may determine that the probability that the base station 2 receives the uplink signal D1-3 and successfully decodes the uplink signal D1-3 will be improved, and thus the user equipment 1 may skip the transmission of the uplink signal D1-4. Similarly, in the second transport block interval TBV2, the user equipment 1 still uses the updated resource block size to transmit the uplink signals D2-1 to D2-4, but the uplink signals are transmitted intermittently, i.e., only the uplink signal D2-1 and the uplink signal D2-3 are transmitted.

Thereafter, the user equipment 1 updates the resource block size again and keeps transmitting the uplink signals intermittently after receiving another dynamic indication message 202 at the second time point T2 (before the uplink signal D3-1 is transmitted). Therefore, in the third transport block interval TB3, the user equipment 1 uses the updated resource block size to transmit the uplink signals D3-1 and D3-3 discontinuously. It shall be appreciated that, the resource blocks that are suspended for uplink signal transmission (i.e., the resource blocks represented by shaded portions) of FIG. 3C are only taken as an example for illustration, and are not intended to limit the present invention. In practical application, the time interval and resource block for skipping the uplink signal transmission vary depending on the number of times of repetition transmission or the length of the transport block interval. For example, when the number of times of repetition transmission is eight, the user equipment 1 may skip two times of uplink signal transmission each time after an uplink signal is transmitted.

Moreover, in the aforesaid implementation scenarios, the resource blocks for repetition transmission in each of the transport block intervals are continuous resources in term of time. However, as shall be appreciated by those of ordinary skill in the art, the resource blocks for repetition transmission in each of the transport block intervals may also be discontinuous resources in term of time, depending on practical operation requirements of the communication system. For example, a time interval of one or more resource blocks may exist between any two adjacent resource blocks for repetition transmission in each of the transport block intervals.

Figure 3D:
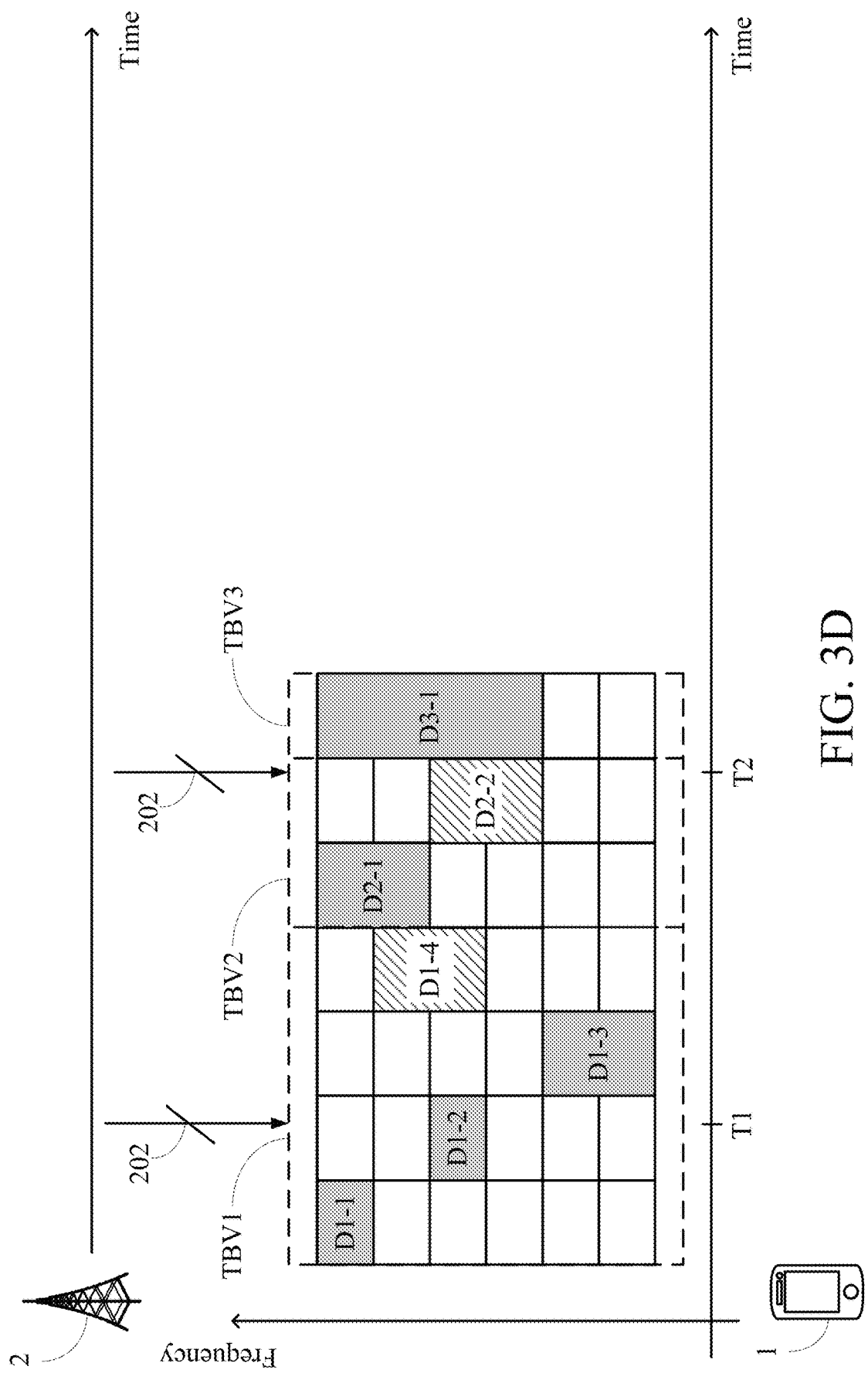

Please refer to FIG. 3D for another implementation scenario. The implementation scenario of FIG. 3D combines the implementation scenarios of FIG. 3B and FIG. 3C. In the implementation scenario of FIG. 3D, the repetition pattern comprises a time-domain repetition pattern and a repetition transmission mode. Thus, as compared to FIG. 3C, after receiving the dynamic indication message 202 at the first time point T1, the user equipment 1 further updates the time-domain resource pattern for repeatedly transmitting the uplink data, i.e., updates the number of times of repetition transmission or the length of the transport block interval, in addition to updating the resource block size that is used currently for transmitting the uplink signal and the repetition transmission mode.

As shown in FIG. 3D, after receiving the dynamic indication message 202, the user equipment 1 uses the updated resource block size to transmit the uplink signal D1-3 and skips the transmission of the uplink signal D1-4 within the first transport block interval TBV1. Similarly, the user equipment 1 only transmits the uplink signal D2-1 and skips the transmission of the uplink signal D2-2 in the second transport block interval TBV2, and the user equipment 1 only transmits the uplink signal D3-1 in the third transport block interval TBV3.

Figure 3E:
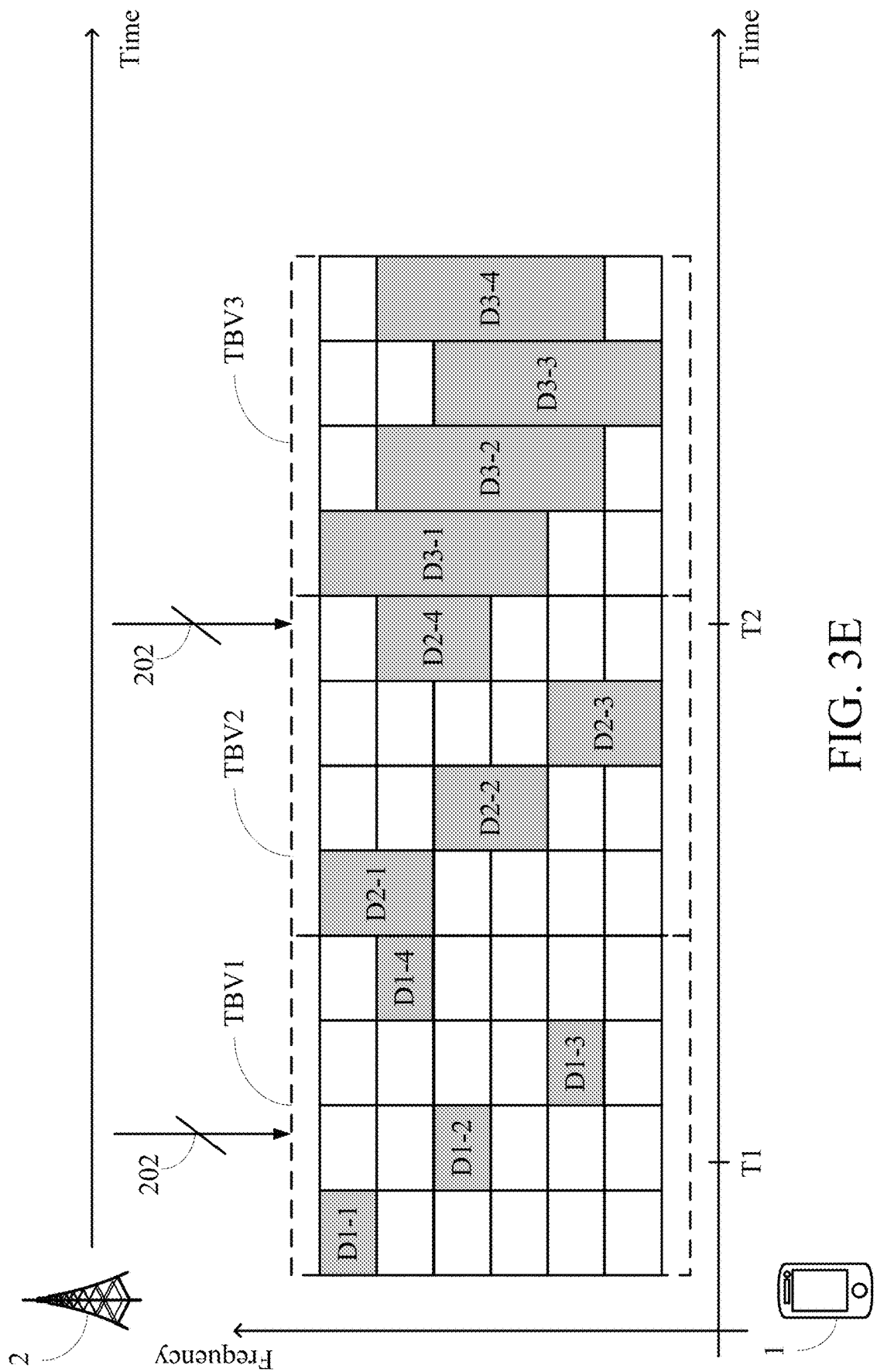

Please refer to FIG. 3E for another implementation scenario. In FIG. 3E, after receiving the dynamic indication message 202 at the first time point T1, the user equipment 1 updates the resource block size for transmitting the uplink signal in the next transport block interval (i.e., the second transport block interval TBV2) instead of directly updating the resource block size for transmitting the uplink signal in the current transport block interval (i.e., the first transport block interval TBV1), as compared to FIG. 3A. In other words, in FIG. 3E, no matter at which time point the dynamic indication message 202 is received by the user equipment 1, the updated data repetition transmission parameter is only applied to the next transport block interval to transmit the uplink signal. As shown in FIG. 3E, the resource block size for transmitting the uplink signals D1-3 and D1-4 is not changed in the first transport block interval TBV1, and the increase of the resource block size for transmitting the uplink signals D2-1 to D2-4 is started to be applied in the second transport block interval TBV2.

Figure 3F:
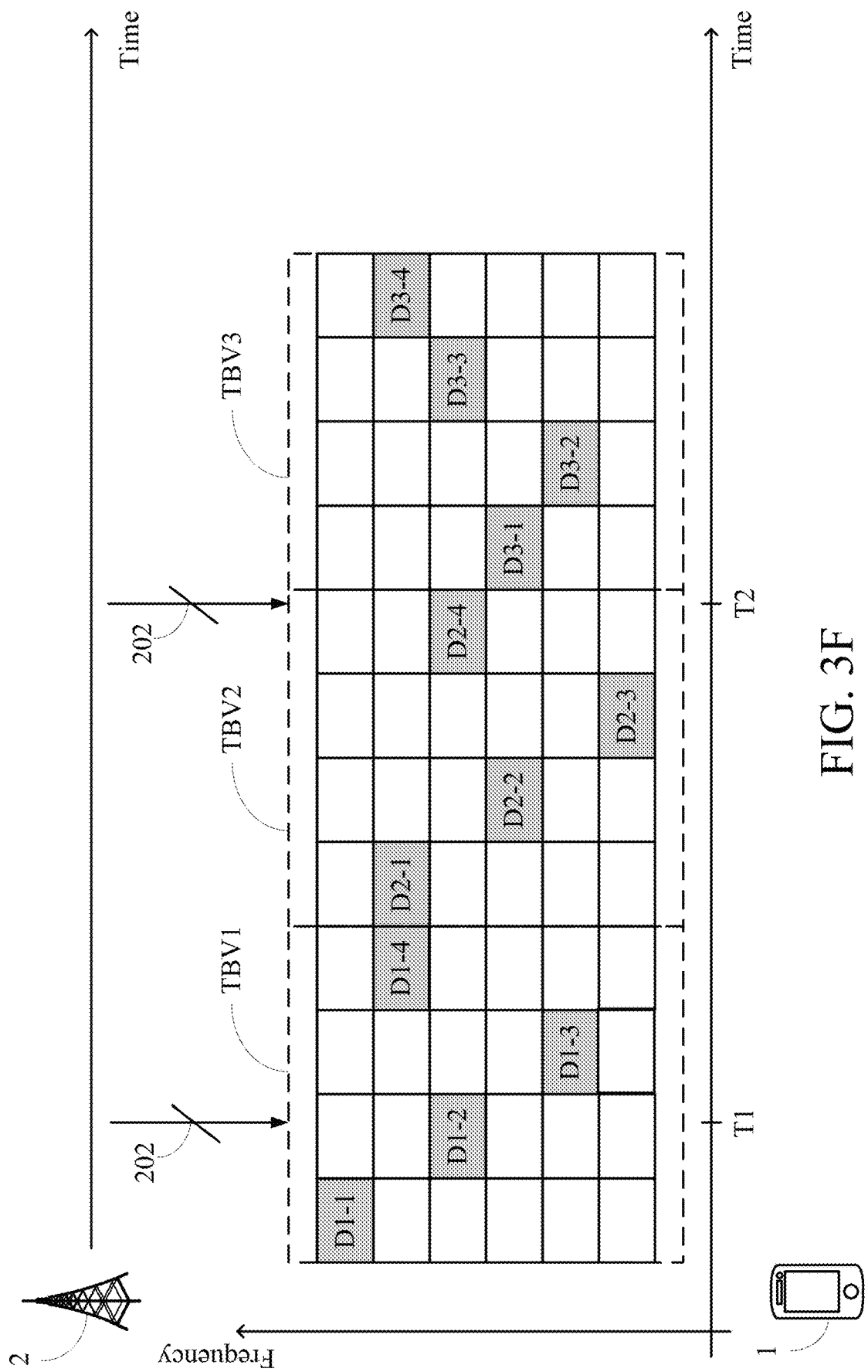

Please refer to FIG. 3F for another implementation scenario. In this implementation scenario, the repetition pattern is a frequency repetition pattern which defines the frequency position of the resource block. Different from the implementation scenarios of FIG. 3A to FIG. 3E, in the implementation scenario of FIG. 3F, the user equipment 1 updates the frequency repetition pattern immediately after receiving the dynamic indication message 202 at the first time point T1. In other words, in the implementation scenario of FIG. 3F, different transport block intervals transmit uplink signals with different frequency repetition patterns to achieve the transmission mode similar to frequency hopping so as to increase the transmission diversity, thereby avoiding severe interference or deep fading in a specific frequency band in a particular time interval.

Figure 3G:
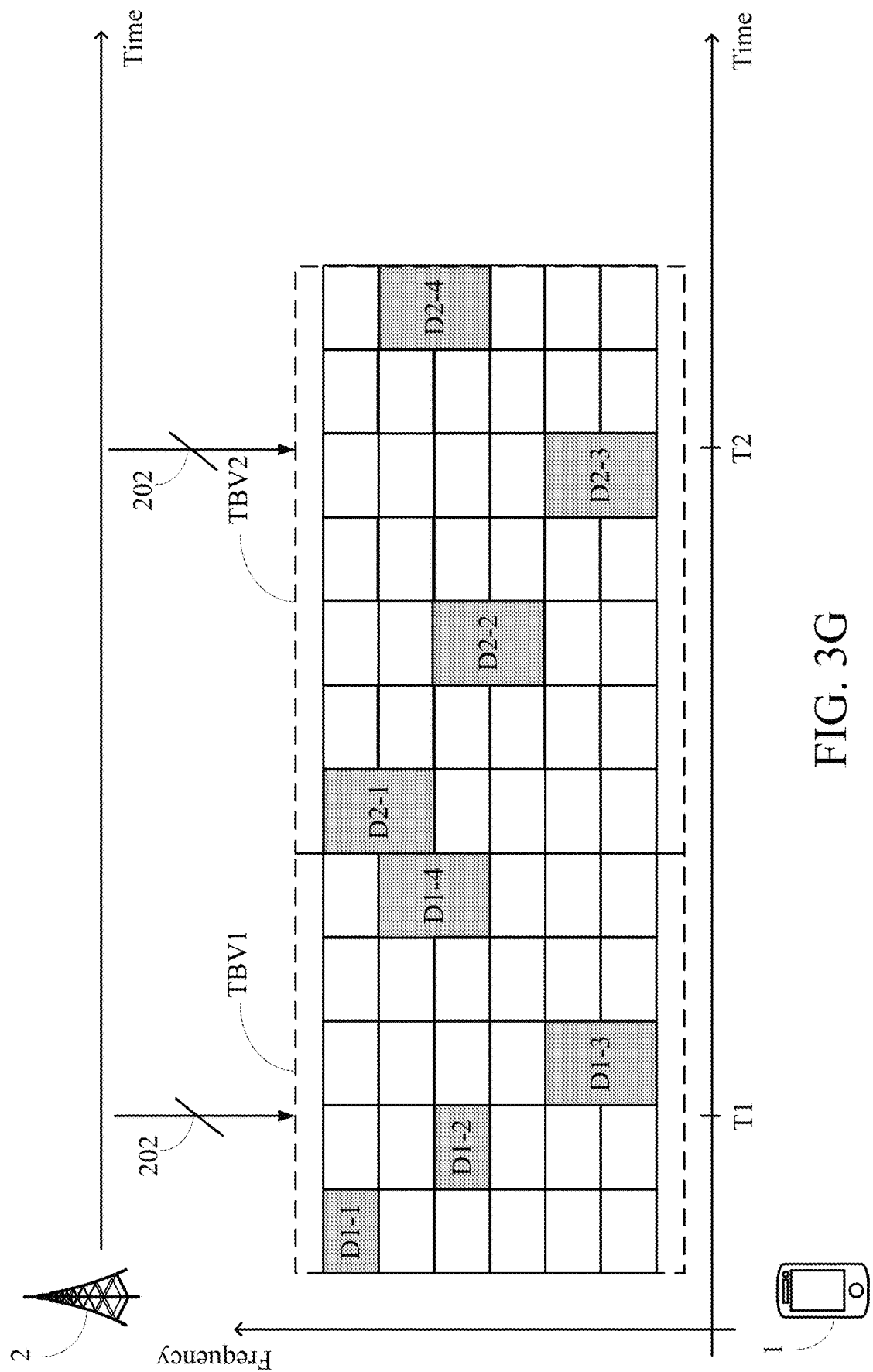

Please refer to FIG. 3G for another implementation scenario. In this implementation scenario, the repetition pattern is a time-domain repetition pattern, which defines the time-domain position of the resource block. Different from the implementation scenario of FIG. 3A, in the implementation scenario of FIG. 3G, the user equipment 1 further updates the time-domain repetition pattern to prolong the period of the repetition transmission in addition to updating the resource block size after the user equipment 1 receives the dynamic indication message 202 at the first time point T1. For example, in FIG. 3G, the number of times of repetition transmission of the user equipment 1 keeps unchanged, but the period of the repetition transmission is doubled. As described previously, under the scheme of early termination of the transport block, the user equipment 1 may stop transmitting the subsequent uplink signal corresponding to the current transport block immediately after the user equipment 1 received the downlink indication message informing of the successful decoding of the uplink signal from the base station 2. Therefore, although the period of the repetition transmission is prolonged in the implementation scenario of FIG. 3G, the probability of successfully decoding the uplink signal by the base station 2 is also increased accordingly in the case where the resource block size is increased. Therefore, unnecessary transmission may also be omitted by prolonging the period of the repetition transmission, thereby increasing the utilization efficiency of the frequency spectrum.

It shall be appreciated that, for simplification of the description, FIG. 3A to FIG. 3G illustrate the change in the resource block size and the change in the length of the transport block interval with proportions represented by grids of equal sizes. However, as shall be appreciated by those of ordinary skill in the art, the change in the resource block size and the change in the length of the transport block interval are not limited to proportions represented by grids of equal sizes. Moreover, in the aforesaid implementation scenarios of FIG. 3A to FIG. 3G, various main data repetition transmission parameters are updated as examples for illustration. However, as shall be appreciated by those of ordinary skill in the art, the present invention may also update the data repetition transmission parameter by combining the aforesaid implementation scenarios or changing various combinations of the aforesaid implementation scenarios, and thus this will not be further described herein.

Figure 4:
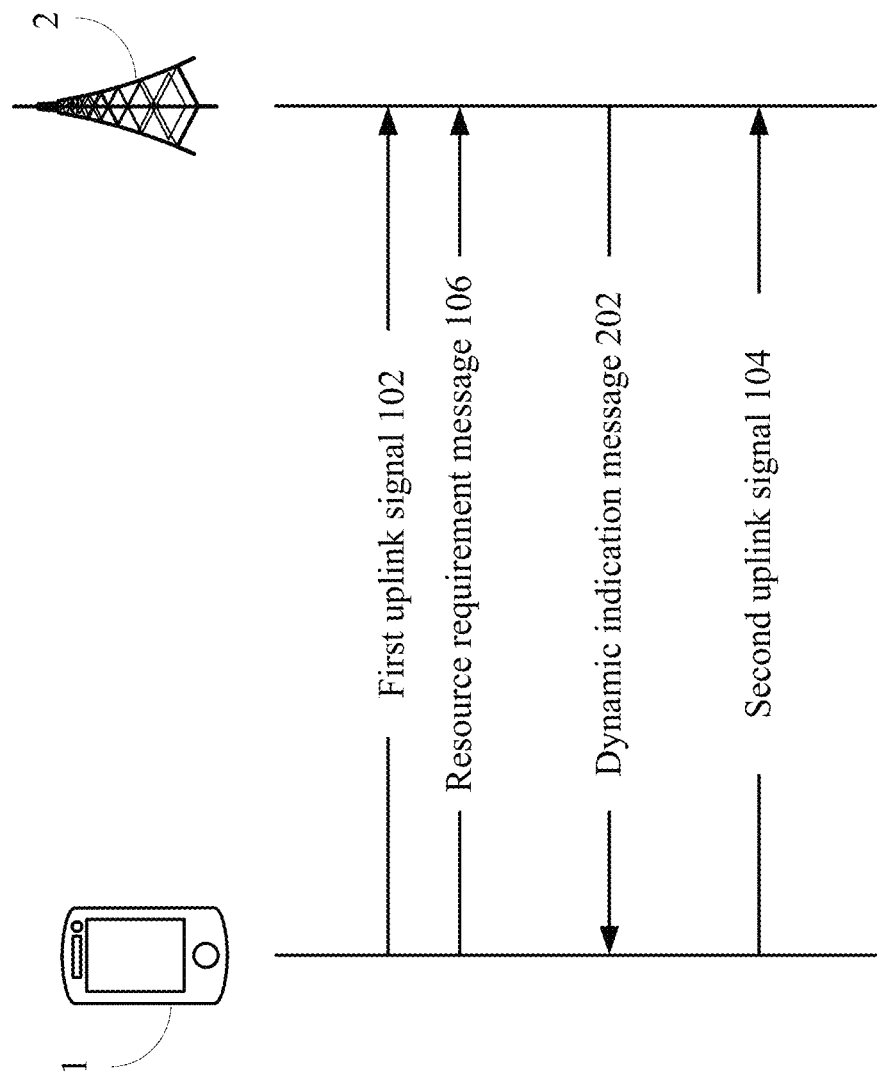
FIG. 4 depicts an implementation scenario of signal transmission between the user equipment 1 and the base station 2 of the present invention.

Please refer to FIG. 4 for a second embodiment of the present invention. The second embodiment is an extension of the first embodiment. In this embodiment, the user equipment 1 further transmits a resource requirement message 106 so that the base station 2 transmits the dynamic indication message 202 according to the resource requirement message 106. The resource requirement message 106 may be similar to a Buffer Status Report (BSR) and is used by the base station 2 for evaluating the repetition transmission resource configuration. The resource requirement message 106 may be implemented by a preamble. For example, the base station 2 may pre-configure one or more specific preambles to the user equipment 1 to serve as a request for resource requirement updating, especially when the current repetition transmission resource configuration indicated by the base station 2 does not satisfy the requirements of the user equipment 1. When the user equipment 1 intends to make the base station 2 change the repetition transmission resource configuration, the user equipment 1 may first transmit a specific preamble to the base station 2 before transmitting the uplink signal so that the base station 2 generates a repetition transmission resource configuration satisfying the transmission requirements of the user equipment 1 according to the resource requirement message 106.

Moreover, in an embodiment, the resource requirement message 106 may also be implemented by an uplink control message, so the user equipment 1 may transmit the resource requirement message 106 in a Physical Uplink Control Channel (PUCCH). In another embodiment, the resource requirement message 106 may also be implemented by a reference signal, e.g., an Uplink Demodulation Reference Signal (DM-RS) or an Uplink Sounding Reference Signal (SRS). Therefore, specific reference signals may be predetermined between the base station 2 and the user equipment 1 in advance to serve as the request for resource requirement updating.

Figure 5:
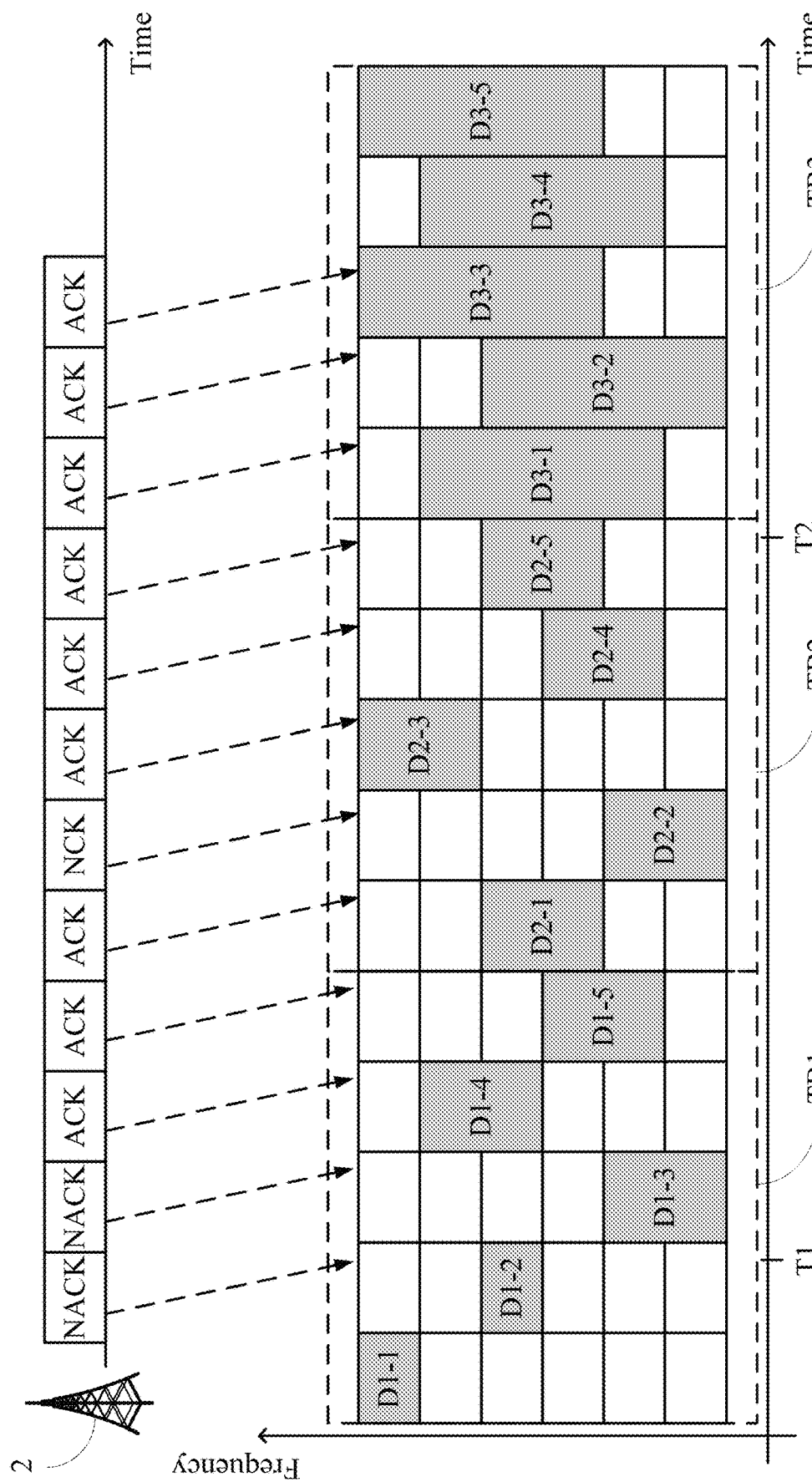
FIG. 5 depicts an implementation scenario of signal transmission between the user equipment 1 and the base station 2 of the present invention.

A third embodiment of the present invention is as shown in FIG. 5. The third embodiment is an extension of the first embodiment. In this embodiment, the user equipment 1 stores a repetition transmission parameter updating rule. The repetition transmission parameter updating rule may be defined within communication system specifications, or may be determined by the base station 2 and then transmitted to the user equipment 1 so that the user equipment 1 obtains the common repetition transmission parameter updating rule with the base station 2. The dynamic indication message 202 may be implemented by a decoding correctness indicator. The decoding correctness indicator is used to indicate Acknowledgement (ACK) or Negative Acknowledgement (NACK) so that the user equipment 1 generates an updated data repetition transmission parameter according to the decoding correctness indictor and the repetition transmission parameter updating rule. The dynamic indication message 202 may be carried in a specific physical downlink channel, e.g., a PHICH, but it is not limited thereto.

For example, the repetition transmission parameter updating rule indicates that the user equipment 1 may keep using the current data repetition transmission parameter for subsequent uplink signal transmission when the decoding correctness indicator received by the user equipment 1 indicates ACK. However, when two successive decoding correctness indicators received by the user equipment 1 all indicate NACK, the user equipment 1 may generate an updated data repetition transmission parameter (e.g., update the data repetition transmission parameter downward by a level, and each level may define a specific resource block size, a time-domain repetition pattern, a frequency repetition pattern, an MCS and a transmission power) based on the repetition transmission parameter updating rule and transmit subsequent uplink data according to the updated data repetition transmission parameter. In addition to updating the data repetition transmission parameter downward by a level according to successive NACK, the repetition transmission parameter updating rule may also allow the user equipment 1 to update the data repetition transmission parameter upward by a level according to successive ACK. In this embodiment, updating downward by a level refers to increasing the resource block size, while updating upward by a level refers to decreasing the resource block size.

Still refer to FIG. 5 for a fourth embodiment of the present invention. The fourth embodiment is an extension of the third embodiment. Different from the third embodiment, in this embodiment, the dynamic indication message 202 comprises both a decoding correctness indicator and a repetition transmission resource configuration.

For example, the repetition transmission resource configuration comprises at least one of the following data repetition transmission parameters: a repetition pattern, a modulation and coding scheme (MCS) and a transmission power. The user equipment 1 generates an updated data repetition transmission parameter according to the decoding correctness indicator, the repetition transmission parameter updating rule and the repetition transmission resource configuration. In other words, in this embodiment, the updating of the resource block size is based on the repetition transmission parameter updating rule (e.g., the resource block size is increased in response to successive NACK and is decreased in response to successive ACK) while other parameters (e.g., the repetition pattern, the MCS and the transmission power) are specifically configured by the base station 2.

Figure 6:
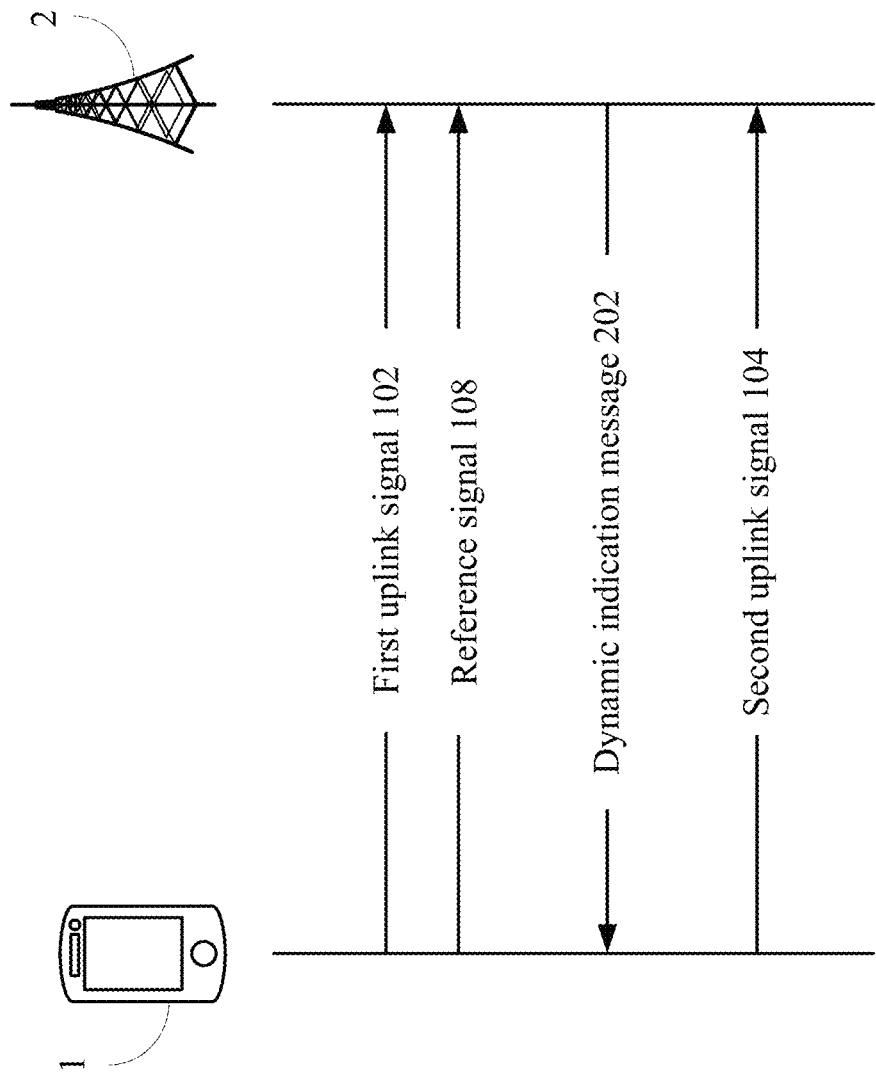
FIG. 6 depicts an implementation scenario of signal transmission between the user equipment 1 and the base station 2 of the present invention.
Figure 7:
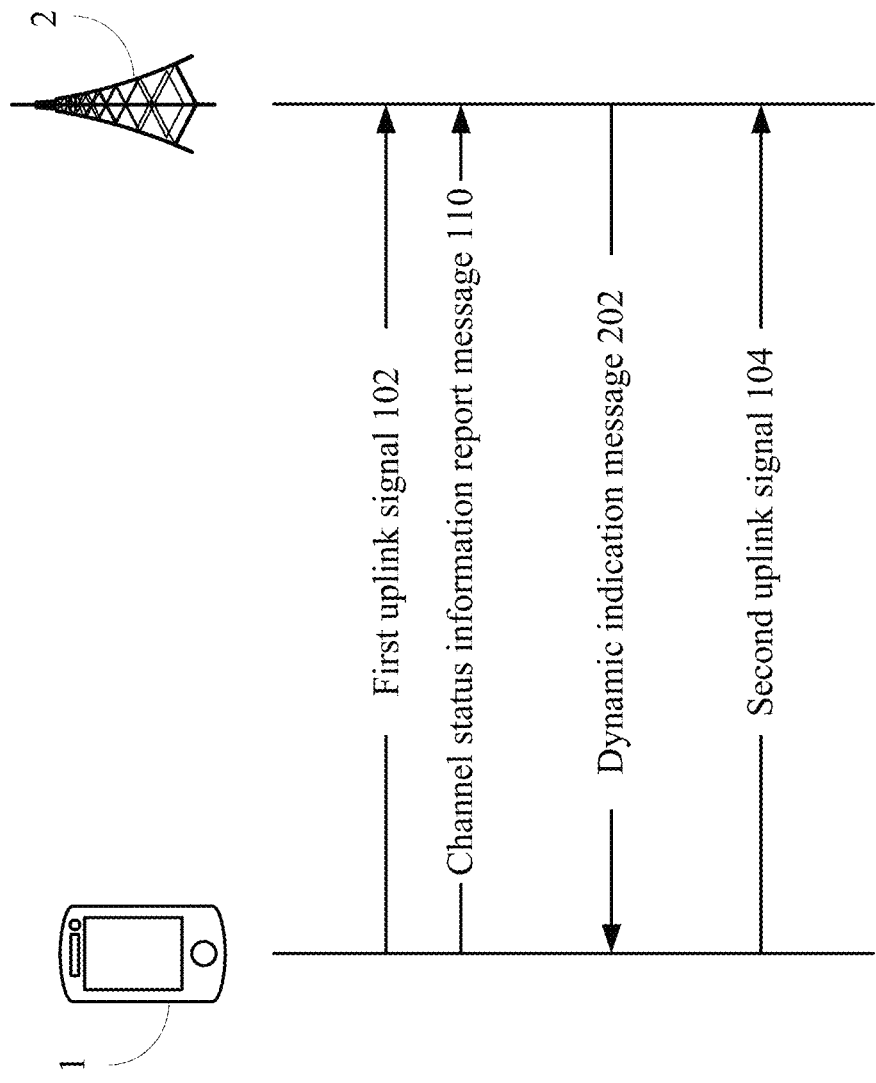
FIG. 7 depicts an implementation scenario of signal transmission between the user equipment 1 and the base station 2 of the present invention.

Please refer to FIG. 6 to FIG. 7 for a fifth embodiment of the present invention. As shown in FIG. 6, the user equipment 1 may transmit a reference signal 108 (e.g., a sounding reference signal or a demodulation reference signal) so that the base station 2 performs an uplink channel measurement to generate the dynamic indication message 202. Moreover, as shown in FIG. 7, the user equipment 1 may also measure a downlink channel and then transmit a channel status information report message 110 so that the base station 2 generates the dynamic indication message 202 according to the channel status information report message 110. In other words, in this embodiment, the time to generate the dynamic indication message 202 is determined by the base station 2 itself based on the measurement of the uplink channel or the downlink channel measurement result reported from the user equipment 1. Therefore, based on the channel measurement, the base station 2 may evaluate the quality of the signal transmitted by the user equipment 1 and meanwhile evaluate the overall resources currently available so as to update the repetition transmission resource configuration.

Figure 8A:
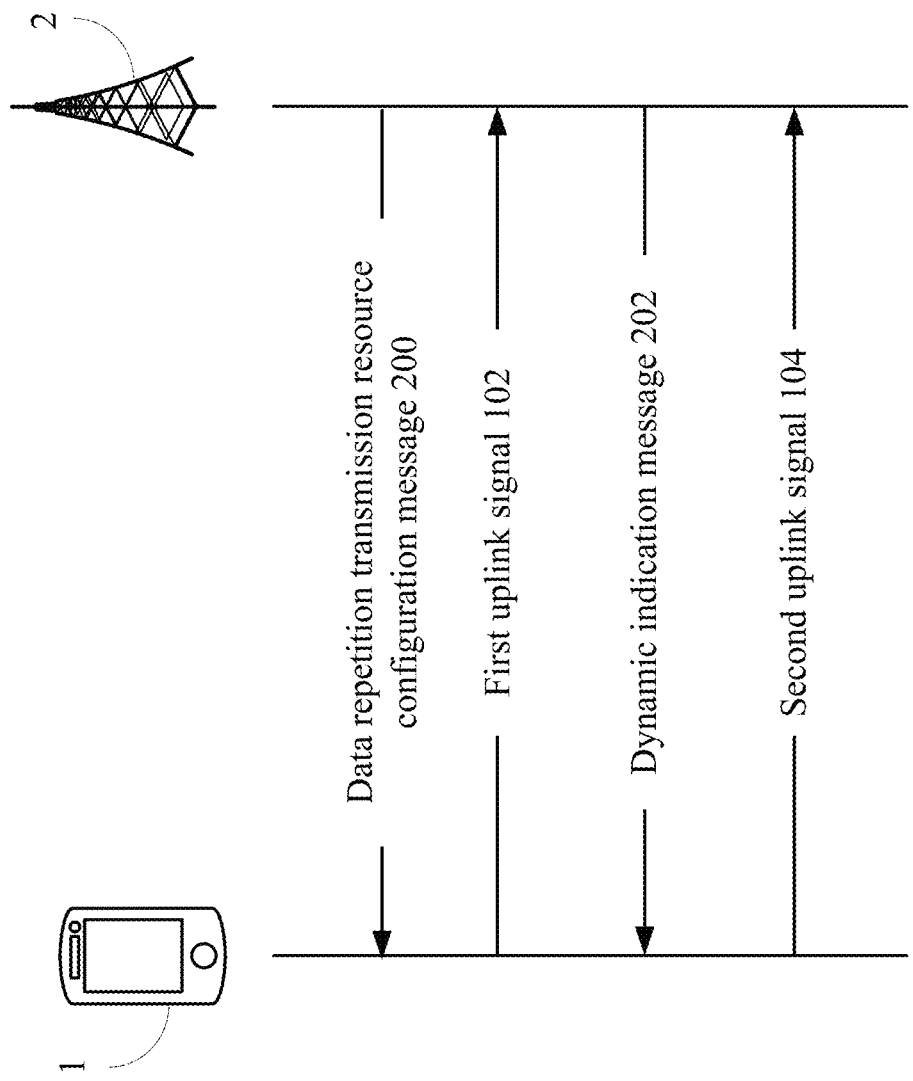
FIG. 8A to FIG. 8C respectively depict different implementation scenarios of signal transmission between the user equipment 1 and the base station 2 of the present invention.
Figure 8B:
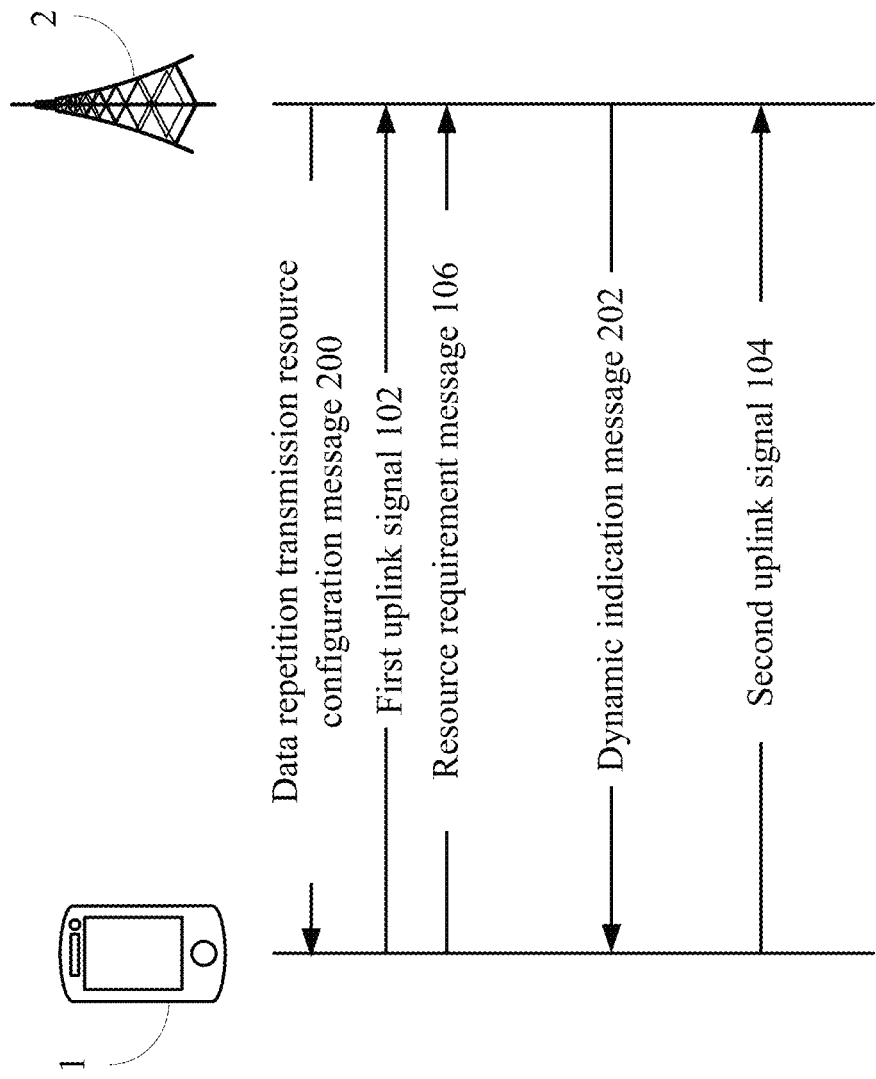
Figure 8C:
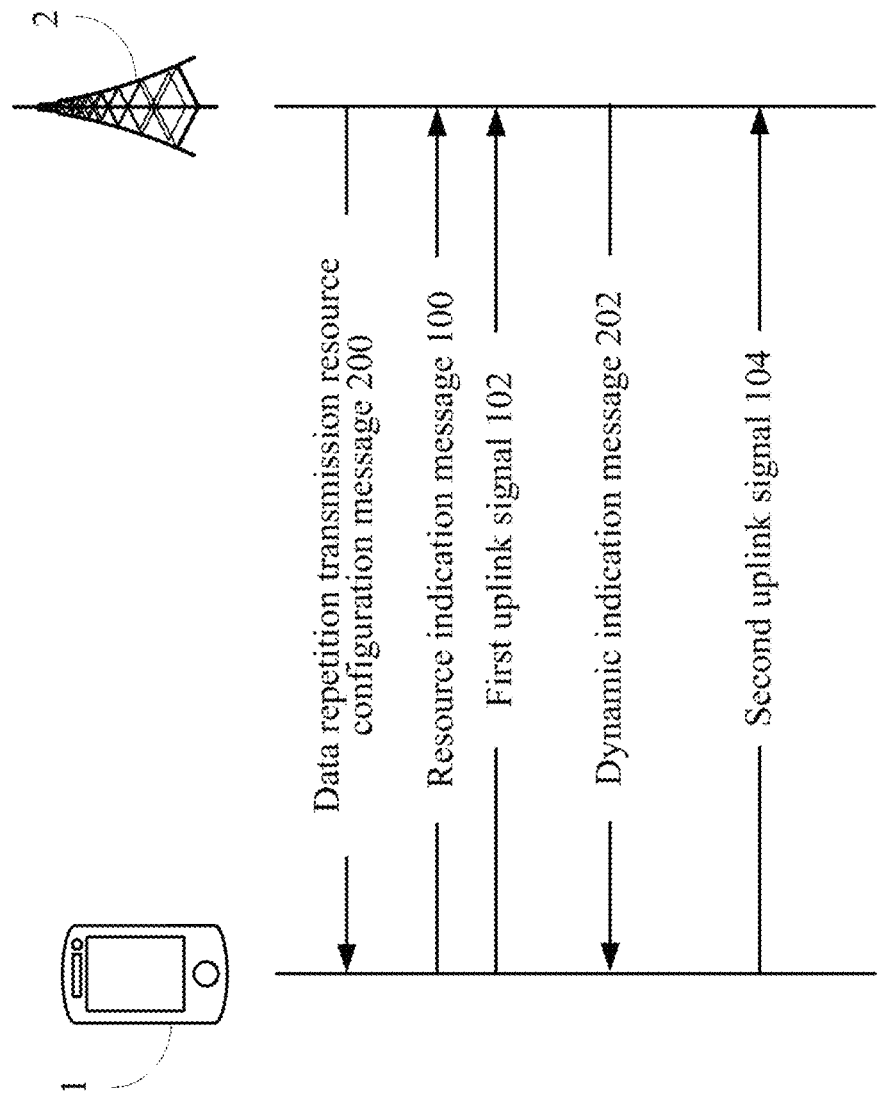

A sixth embodiment of the present invention is as shown in FIG. 8A to FIG. 8C. The sixth embodiment is an extension of the aforesaid embodiments. Referring to FIG. 8A, the user equipment 1 receives a data repetition transmission resource configuration message 200 from the base station 2. The data repetition transmission resource configuration message 200 comprises a plurality of data repetition transmission resource configuration sets and corresponding time-domain/frequency-domain resource mapping information. In this way, the user equipment 1 may generate the current data repetition transmission parameter according to the data repetition transmission resource configuration sets. The data repetition transmission resource configuration message 200 may be a radio resource control (RRC) message. The data repetition transmission resource configuration sets and corresponding time-domain/frequency-domain resource mapping information are pre-configured by the base station 2 so that the user equipment 1 can select an appropriate resource block and data repetition transmission mode in real time for uplink data transmission without the need of requesting transport resources from the base station (i.e., in the case of uplink grant-free).

For example, the user equipment 1 may transmit the first uplink signal 102 according to parameters recorded in the data repetition transmission resource configuration sets and corresponding time-domain/frequency-domain resource mapping information depending on transmission requirements of the user equipment 1. If the user equipment 1 determines that all the parameters in the data repetition transmission resource configuration sets that are pre-configured by the base station 2 cannot satisfy the transmission requirements for transmitting the first uplink signal 102, then as described in the second embodiment, the user equipment 1 may transmit the resource requirement message 106 together with the first uplink signal 102 to the base station 2 or transmit the resource requirement message 106 to the base station 2 before the first uplink signal 102 is transmitted so that the base station 2 generates the dynamic indication message 202 in response to the resource requirement message 106, as shown in FIG. 8B.

It shall be appreciated that, each of the data repetition transmission resource configuration sets may record a combination of different types of parameters. Taking three repetition transmission resource configuration sets as an example for illustration, the first repetition transmission resource configuration set comprises a first resource block size, a first repetition pattern, a first MCS and a first transmission power, the second repetition transmission resource configuration set comprises a second resource block size, a second repetition pattern, a second MCS and a second transmission power, and the third repetition transmission resource configuration set comprises a third resource block size, a third repetition pattern, a third MCS and a third transmission power. Accordingly, the user equipment 1 may select the parameters recorded in one of the data repetition transmission resource configuration sets for transmitting the first uplink signal 102 according to the transmission requirements of the user equipment 1, the channel measurement performed by the user equipment 1 or the user equipment 1 may select randomly (e.g., based on the identification (ID) code of the user equipment). Moreover, the base station 2 may also carry priority selection information in the data repetition transmission resource configuration message 200 so that the user equipment 1 selects the parameters recorded in one of the data repetition transmission resource configuration sets based on the priority selection information.

Moreover, each of the data repetition transmission resource configuration sets may record a combination of the same type of parameters. Taking four repetition transmission resource configuration sets as an example for illustration, the first repetition transmission resource configuration set comprises a first resource block size, a second resource block size, and a third resource block size, the second repetition transmission resource configuration set comprises a first repetition pattern, a second repetition pattern and a third repetition pattern, the third repetition transmission resource configuration set comprises a first MCS, a second MCS and a third MCS, and the fourth repetition transmission resource configuration set comprises a first transmission power, a second transmission power and a third transmission power. Accordingly, the user equipment 1 may select one of the parameters recorded in each of the data repetition transmission resource configuration sets for transmitting the first uplink signal 102 according to the transmission requirements thereof.

Additionally, as shown in FIG. 8C, the user equipment 1 may also transmit a resource indication message 100 together with or before the uplink signal to inform the base station 2 of the selected parameters (i.e., the current data repetition transmission parameters) so that the base station 2 receives the uplink signal in response to the resource indication message 100. Moreover, in an embodiment, the resource indication message 100 may carry or indicate a transport block index (TB index) or a Hybrid Automatic Repeat reQuest (HARQ) Process ID so that the base station 2 can learn the transport block corresponding to the uplink signal currently transmitted by the user equipment 1. Furthermore, the resource indication message 100 may also indicate the data type of the transmitted uplink signal. For example, the user equipment 1 may indicate that the data type of the transmitted uplink signal belongs to the URLLC service or the eMBB service by using the resource indication message 100. Similarly, the resource indication message 100 may be implemented by one of an uplink control signal, a reference signal and a preamble.

Figure 9:
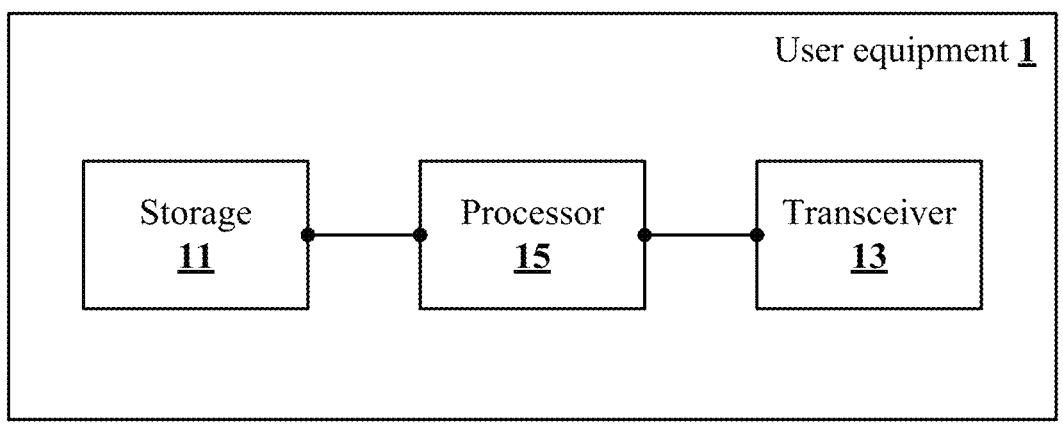
FIG. 9 is a schematic view of the user equipment 1 of the present invention.

A seventh embodiment of the present invention is as shown in FIG. 9, which is a schematic view of the user equipment 1 of the present invention. The user equipment 1 comprises a storage 11, a transceiver 13 and a processor 15. The processor 15 is electrically connected to the storage 11 and the transceiver 13. The processor 15 transmits the first uplink signal 102 to the base station 2 based on a current data repetition transmission parameter. The processor 15 receives the dynamic indication message 202 from the base station 2 via the transceiver 13. As the implementation scenarios described in the first embodiments, the dynamic indication message 202 indicates the repetition transmission resource configuration which may comprise at least one of the following data repetition transmission parameters: a resource block size, a repetition pattern, an MCS and a transmission power. The processor 15 generates an updated data repetition transmission parameter according to the dynamic indication message 202 after receiving the dynamic indication message 202 and transmits the second uplink signal 104 to the base station 2 via the transceiver 13 based on the updated data repetition transmission parameter, as shown in FIG. 2.

In an embodiment, the dynamic indication message is a downlink control information (DCI). In an embodiment, the processor 15 further transmits the resource requirement message 106 via the transceiver 13 so that the base station 2 transmits the dynamic indication message 202 according to the resource requirement message 106, as shown in FIG. 4. In other embodiments, the resource requirement message 106 is one of an uplink control signal, a reference signal and a preamble.

Moreover, in an embodiment, the storage 11 stores a repetition transmission parameter updating rule. As described in the third embodiment, the repetition transmission parameter updating rule may be defined by the communication system specifications or may be decided by the base station 2 and then transmitted to the user equipment 1. In this case, the dynamic indication message comprises a decoding correctness indicator so that the processor 15 generates the updated data repetition transmission parameter according to the decoding correctness indicator and the repetition transmission parameter updating rule.

In an embodiment, the processor 15 may measure a downlink channel and then transmit the channel status information report message 110 via the transceiver 13 so that the base station 2 generates the dynamic indication message 202 according to the channel status information report message 110, or the processor 15 may transmit the reference signal 108 (e.g., at least one of a sounding reference signal and a demodulation reference signal) via the transceiver 13 so that the base station 2 performs a channel measurement to generate the dynamic indication message 202.

In an embodiment, the storage 11 stores a repetition transmission parameter updating rule, and the dynamic indication message comprises a decoding correctness indicator and a repetition transmission resource configuration. The repetition transmission resource configuration comprises at least one of the following parameters: a repetition pattern, an MCS and a transmission power. Therefore, the processor 15 may generate the updated data repetition transmission parameter according to the decoding correctness indicator, the repetition transmission parameter updating rule and the repetition transmission resource configuration.

Additionally, in an embodiment, the processor 15 further receives the data repetition transmission resource configuration message 200 which indicates a plurality of data repetition transmission resource configuration sets from the base station 2 via the transceiver 13, and generates the current data repetition transmission parameter according to the data repetition transmission resource configuration sets. Moreover, in an embodiment, the processor 15 further transmits the resource indication message 100 to the base station 2 via the transceiver 13. The resource indication message 100 is used to indicate the current data repetition transmission parameter.

Figure 10:
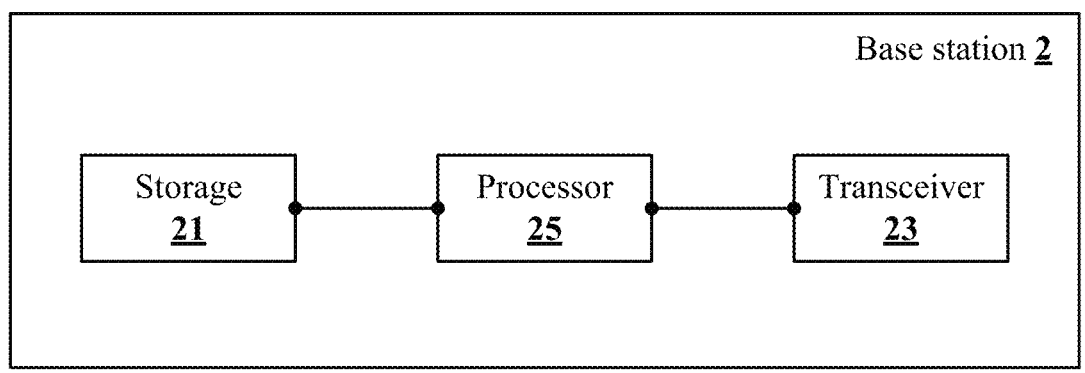
FIG. 10 is a schematic view of the base station 2 of the present invention.

An eighth embodiment of the present invention is as shown in FIG. 10, which is a schematic view of the base station 2 of the present invention. The base station 2 comprises a storage 21, a transceiver 23 and a processor 25. The processor 25 is electrically connected to the storage 21 and the transceiver 23. The processor 25 receives the first uplink signal 102 from the user equipment 1 via the transceiver 23. The first uplink signal 102 is transmitted by the user equipment 1 based on a current data repetition transmission parameter. The processor 25 transmits the dynamic indication message 202 to the user equipment 1 via the transceiver 23 so that the user equipment 1 generates an updated data repetition transmission parameter according to the dynamic indication message 202 and transmits the second uplink signal 104 based on the updated data repetition transmission parameter. The processor 25 receives the second uplink signal 104 from the user equipment via the transceiver 23.

In an embodiment, the dynamic indication message indicates a repetition transmission resource configuration which may comprise at least one of the following parameters: a resource block size, a repetition pattern, an MCS and a transmission power. The dynamic indication message transmitted by the processor 25 is a downlink control information (DCI).

Furthermore, in an embodiment, the processor 25 further receives the resource requirement message 106 from the user equipment via the transceiver 23 and transmits the dynamic indication message 202 according to the resource requirement message 106. The resource requirement message is one of an uplink control signal, a reference signal and a preamble.

In an embodiment, the dynamic indication message 202 comprises a decoding correctness indicator so that the user equipment 1 generates the updated data repetition transmission parameter according to the decoding correctness indicator and a repetition transmission parameter updating rule.

Moreover, in an embodiment, the processor 25 further receives a channel status information report message 110 from the user equipment 1 via the transceiver 23 so as to generate the dynamic indication message 202 according to the channel status information report message 110. In other embodiments, the processor 25 may also receive the reference signal 108 (e.g., at least one of a sounding reference signal and a demodulation reference signal) via the transceiver 23 and perform a channel measurement to generate the dynamic indication message 202.

In an embodiment, the dynamic indication message 202 comprises a decoding correctness indicator and a repetition transmission resource configuration so that the user equipment generates the updated data repetition transmission parameter according to the decoding correctness indicator, the repetition transmission parameter updating rule and the repetition transmission resource configuration. The repetition transmission resource configuration may comprise at least one of the following data repetition transmission parameters: a repetition pattern, an MCS and a transmission power.

Additionally, in an embodiment, the processor 25 further transmits the data repetition transmission resource configuration message 200 which indicates a plurality of data repetition transmission resource configuration sets via the transceiver 23 so that the user equipment generates the current data repetition transmission parameter according to the data repetition transmission resource configuration sets. Moreover, in an embodiment, the processor 25 further receives the resource indication message 100 from the user equipment 1 via the transceiver 23. The resource indication message 100 is used to indicate the current data repetition transmission parameter.

According to the above descriptions, the uplink data repetition transmission configuration scheme of the present invention allows the user equipment to update the data repetition transmission parameters according to the dynamic indication message transmitted by the base station, or allows the base station to configure the repetition transmission resource satisfying the transmission requirements of the user equipment depending on the transmission requirements of the user equipment. Accordingly, the uplink data repetition transmission configuration scheme of the present invention may improve the resource utilization efficiency, the using flexibility of the spectrum resources, the flexibility of the reception delay, the applications and the autonomy of the user equipment while reducing the influence of the channel.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A user equipment, comprising:
   a storage;
   a transceiver; and
   a processor electrically connected to the storage and the transceiver, being configured to perform the following operations:
   transmitting a first uplink signal to a base station based on a current data repetition transmission parameter;
   receiving a dynamic indication message from the base station via the transceiver;
   generating an updated data repetition transmission parameter according to the dynamic indication message after receiving the dynamic indication message; and
   transmitting a second uplink signal to the base station via the transceiver based on the updated data repetition transmission parameter.

2. The user equipment of claim 1, wherein the processor further transmits a resource requirement message via the transceiver so that the base station transmits the dynamic indication message according to the resource requirement message.

3. The user equipment of claim 2, wherein the resource requirement message is one of an uplink control signal, a reference signal and a preamble.

4. The user equipment of claim 1, wherein the dynamic indication message is downlink control information (DCI).

5. The user equipment of claim 1, wherein the storage stores a repetition transmission parameter updating rule, the dynamic indication message comprises a decoding correctness indicator, and the processor generates the updated data repetition transmission parameter according to the decoding correctness indicator and the repetition transmission parameter updating rule.

6. The user equipment of claim 1, wherein the processor further transmits a channel status information report message via the transceiver so that the base station generates the dynamic indication message according to the channel status information report message.

7. The user equipment of claim 1, wherein the processor further transmits at least one of a sounding reference signal and a demodulation reference signal via the transceiver so that the base station performs a channel measurement to generate the dynamic indication message.

8. The user equipment of claim 1, wherein the storage stores a repetition transmission parameter updating rule, the dynamic indication message comprises a decoding correctness indicator and a repetition transmission resource configuration, and the processor generates the updated data repetition transmission parameter according to the decoding correctness indicator, the repetition transmission parameter updating rule and the repetition transmission resource configuration.

9. The user equipment of claim 8, wherein the repetition transmission resource configuration comprises at least one of following data repetition transmission parameters: a repetition pattern, a modulation and coding scheme (MCS) and a transmission power.

10. The user equipment of claim 1, wherein the dynamic indication message indicates a repetition transmission resource configuration, and the repetition transmission resource configuration comprises at least one of following data repetition transmission parameters: a resource block size, a repetition pattern, an MCS and a transmission power.

11. The user equipment of claim 1, wherein the processor further receives a data repetition transmission resource configuration message which indicates a plurality of data repetition transmission resource configuration sets from the base station via the transceiver, and generates the current data repetition transmission parameter according to the data repetition transmission resource configuration sets.

12. The user equipment of claim 11, wherein the processor further transmits a resource indication message to the base station via the transceiver, and the resource indication message indicates the current data repetition transmission parameter.

13. A base station, comprising:
   a storage;
   a transceiver; and
   a processor electrically connected to the storage and the transceiver, being configured to perform the following operations:
   receiving a first uplink signal from a user equipment via the transceiver, the first uplink signal being transmitted by the user equipment based on a current data repetition transmission parameter;

transmitting a dynamic indication message to the user equipment via the transceiver so that the user equipment generates an updated data repetition transmission parameter according to the dynamic indication message and transmits a second uplink signal based on the updated data repetition transmission parameter; and receiving the second uplink signal from the user equipment via the transceiver.

14. The base station of claim 13, wherein the processor further receives a resource requirement message from the user equipment via the transceiver and transmits the dynamic indication message according to the resource requirement message.

15. The base station of claim 14, wherein the resource requirement message is one of an uplink control signal, a reference signal and a preamble.

16. The base station of claim 13, wherein the dynamic indication message is downlink control information (DCI).

17. The base station of claim 13, wherein the dynamic indication message comprises a decoding correctness indicator so that the user equipment generates the updated data repetition transmission parameter according to the decoding correctness indicator and a repetition transmission parameter updating rule.

18. The base station of claim 13, wherein the processor further receives a channel status information report message from the user equipment via the transceiver so as to generate the dynamic indication message according to the channel status information report message.

19. The base station of claim 13, wherein the processor further receives at least one of a sounding reference signal and a demodulation reference signal via the transceiver so as to perform a channel measurement to generate the dynamic indication message.

20. The base station of claim 13, wherein the dynamic indication message comprises a decoding correctness indicator and a repetition transmission resource configuration so that the user equipment generates the updated data repetition transmission parameter according to the decoding correctness indicator, the repetition transmission parameter updating rule and the repetition transmission resource configuration.

21. The base station of claim 20, wherein the repetition transmission resource configuration comprises at least one of following data repetition transmission parameters: a repetition pattern, a modulation and coding scheme (MCS) and a transmission power.

22. The base station of claim 13, wherein the dynamic indication message indicates a repetition transmission resource configuration, and the repetition transmission resource configuration comprises at least one of following data repetition transmission parameters: a resource block size, a repetition pattern, an MCS and a transmission power.

23. The base station of claim 13, wherein the processor further transmits a data repetition transmission resource configuration message which comprises a plurality of data repetition transmission resource configuration sets and corresponding time-domain/frequency-domain resource mapping information via the transceiver so that the user equipment generates the current data repetition transmission parameter according to the data repetition transmission resource configuration sets.

24. The base station of claim 23, wherein the processor further receives a resource indication message from the user equipment via the transceiver, and the resource indication message indicates the current data repetition transmission parameter.

* * * * *